US012789430B2

(12) United States Patent
Spuller

(10) Patent No.: US 12,789,430 B2
(45) Date of Patent: Nov. 10, 2026

(54) INJECTION NOZZLE

(71) Applicant: OTTO MÄNNER GMBH, Bahlingen a.K. (DE)

(72) Inventor: Swen Spuller, Forchheim (DE)

(73) Assignee: OTTO MÄNNER GMBH, Bahlingen A.K. (DE)

( * ) Notice: Subject to any disclaimer, the term of this patent is extended or adjusted under 35 U.S.C. 154(b) by 334 days.

(21) Appl. No.: 18/278,934

(22) PCT Filed: Mar. 15, 2022

(86) PCT No.: PCT/EP2022/056700
§ 371 (c)(1),
(2) Date: Aug. 25, 2023

(87) PCT Pub. No.: WO2022/194867
PCT Pub. Date: Sep. 22, 2022

(65) Prior Publication Data

US 2024/0131760 A1 Apr. 25, 2024
US 2024/0227263 A9 Jul. 11, 2024

(30) Foreign Application Priority Data

Mar. 17, 2021 (DE) ..................... 10 2021 106 474.0

(51) Int. Cl.
*B29C 45/23* (2006.01)
*B29C 45/17* (2006.01)
(Continued)

(52) U.S. Cl.
CPC ........ *B29C 45/231* (2013.01); *B29C 45/1781* (2013.01); *B29C 45/0001* (2013.01);
(Continued)

(58) Field of Classification Search
CPC ... B29C 45/22; B29C 45/231; B29C 45/2708; B29C 45/2709; B29C 45/2761;
(Continued)

(56) References Cited

U.S. PATENT DOCUMENTS 1,982,128 A * 11/1934 Vetrano ..................... F04F 5/46 417/198
3,849,048 A * 11/1974 Bielfeldt ............. B29C 45/2806 425/570
(Continued)

FOREIGN PATENT DOCUMENTS

CN 104023931 A 9/2014
DE 10 2016 219 833 A1 4/2017
(Continued)

OTHER PUBLICATIONS

EPO (Rijswijk, NL), English language version of the International Search Report, Form PCT/ISA/210, for International Application PCT/EP2022/056700, Jun. 28, 2022 (3 pages).
(Continued)

*Primary Examiner* — Thu Khanh T. Nguyen
(74) *Attorney, Agent, or Firm* — CANTOR COLBURN LLP

(57) ABSTRACT

The disclosure relates to an injection nozzle suitable for injection molding of thermoplastic materials, in particular polyolefin materials, the injection nozzle including a housing with a sleeve-shaped rear section and a thereto coaxially arranged sleeve-shaped front section surrounding a central passage extending in an axial direction (z) forming part of a melt channel. In the central passage a needle is arranged movable in the axial direction (z) between a retracted open position and an extended closed position in which a gate at a tip of the front section is closed by a front end of the needle in a sealing manner. A spacer is arranged between the rear
(Continued)

section and the front section defining a total length of the housing in the axial direction (z).

16 Claims, 4 Drawing Sheets

(51) Int. Cl.
*B29C 45/00* (2006.01)
*B29C 45/20* (2006.01)

(52) U.S. Cl.
CPC .... *B29C 2045/1737* (2013.01); *B29C 45/176* (2013.01); *B29C 2045/205* (2013.01); *B29C 2045/238* (2013.01)

(58) Field of Classification Search
CPC ............ B29C 45/2764; B29C 45/2769; B29C 45/2806; B29C 45/2813; B29C 45/2855
See application file for complete search history.

(56) References Cited

U.S. PATENT DOCUMENTS

| | | | | |
|---|---|---|---|---|
| 4,378,963 | A * | 4/1983 | Schouenberg | B29C 45/2806 425/572 |
| 5,849,343 | A * | 12/1998 | Gellert | B29C 45/2806 425/549 |
| 6,419,116 | B1 | 7/2002 | Eigler et al. | |
| 2008/0274229 | A1 | 11/2008 | Barnett | |
| 2008/0279979 | A1 * | 11/2008 | Fairy | B29C 45/2806 425/565 |
| 2011/0129561 | A1 | 6/2011 | Adas et al. | |
| 2014/0295014 | A1 | 10/2014 | Favata et al. | |
| 2014/0306365 | A1 | 10/2014 | Duffy et al. | |
| 2017/0100866 | A1 | 4/2017 | Bazzo et al. | |
| 2020/0114553 | A1 * | 4/2020 | Spuller | B29C 45/2806 |

FOREIGN PATENT DOCUMENTS

| | | | |
|---|---|---|---|
| EP | 0 873 841 | A2 | 10/1998 |
| EP | 1 990 175 | A1 | 11/2008 |
| JP | H05-96578 | A | 4/1993 |

OTHER PUBLICATIONS

EPO (Munich, DE), English language Written Opinion of the Int'l Searching Auth., Form PCT/ISA/237, for International Application PCT/EP2022/056700, Jun. 28, 2022 (6 pages).

German Office Action for German Application No. 10 2021 106 474.0; Report Mail Date Jun. 27, 2024 (12 Pages—with English Translation).

Office Action issued in German Application No. 102021106474.0 dated Nov. 29, 2021; 15 pages.

* cited by examiner

INJECTION NOZZLE

CROSS REFERENCE TO RELATED APPLICATION

This application is a National Phase filing in the United States, under 35 USC § 371, of PCT International Patent Application PCT/EP2022/056700, filed on 15 Mar. 2022 which claims the priority of German Patent Application No. DE 10 2021 106 474.0, filed 17 Mar. 2021. The above-referenced applications are hereby incorporated by reference herein in their entirety and are made a part hereof, including but not limited to those portions which specifically appear hereinafter.

BACKGROUND OF THE INVENTION

Field of the Invention

The present disclosure is directed towards the field of injection nozzles for injection molding of thermoplastic materials, in particular Polyolefines.

Discussion of Related Art

EP 0873841 A2 published in 1998 in the name of Mold Masters ltd. relates to valve gated injection molding apparatus having a valve member with a cylindrical front end portion. A one-piece insert mounted at the front end of a nozzle has both a gate and locating blades extending inwardly from an outer body into a central opening leading to the gate. The inner surfaces of the blades fit around the front-end portion of the reciprocating valve pin to guide and very accurately locate it in alignment with the gate. Very accurately maintaining the front-end portion of the reciprocating valve pin in alignment with the gate allows it to be cylindrical rather than tapered which produces a much cleaner gate mark.

EP 1990175 A1 published in November 2008 in the name of Mold Masters ltd. relates to an injection molding apparatus that includes a valve-gated nozzle having a nozzle tip assembly and a valve pin slidably disposed therein. The nozzle tip assembly includes a nozzle liner having a first valve pin guiding portion, a valve pin guide having a second valve pin guiding portion upstream of the first valve pin guiding portion, and a transfer seal having a bore for receiving the nozzle liner and the valve pin guide there-in. The transfer seal bore includes an alignment surface that surrounds the nozzle liner and the valve pin guide to align the first and second valve pin guiding portions with the mold gate, such that the valve pin is accurately aligned during operation. The transfer seal also includes means to couple the nozzle tip assembly to the nozzle body.

DE 102016219833 A1 published in April 2017 in the name of Inglass SPA relates to a nozzle terminal of an injector. The injector comprises a tip and a ring nut having respective distal ends one of which is configured so as to be coupled with a gate of a molding cavity, it cooperates with the shutter terminal of the valve pin of the injector, and it has an overall thickness in cross-section which is equal to or less than that of the cross-section of the shutter terminal of the valve pin.

SUMMARY OF THE INVENTION

Injection nozzles for injection molding thermoplastic materials, in particular polyolefin materials, are during operation arranged in an expensive and precisely manufactured molding tool in order to inject melted thermoplastic material into a cavity of the molding tool. The cavity having a molding cavity contour, defines the shape of plastic parts formed therein by the injected melted plastic material after curing. For an accurate injection of the melted material, the nozzles are fluidly interconnected to the cavity via a gate, open and closable by a movable needle of the respective nozzle. To avoid wear at the molding tool, each gate is formed as part of a tip of a nozzle facing the cavity; the nozzle being less expensive to repair or replace compared to the molding tool in case of damage to gate. To allow manufacturing of high-quality plastic parts having an almost unrecognizable injection mark originating from the gate through which the melted material is injected into the cavity, the nozzle should form during operation a level, or slightly indented, finish with the cavity. Therefore, an injection nozzle is preferably designed to account for thermal expansion and in turn to achieve a good alignment with the cavity during operation.

A preferred variation of an injection nozzle according to the disclosure comprises a housing, in particular suitable to be installed in a corresponding injection molding tool. The housing comprises a sleeve-shaped rear section and a thereto coaxially arranged sleeve-shaped front section surrounding a central passage extending in an axial direction. In the central passage a needle is arranged movable in the axial direction between a retracted open position and an extended closed position in which a gate at a tip of the front section is closed by a front end of the needle in a sealing manner. A spacer is arranged between the rear section and the front section defining a total length of the nozzle in the axial direction.

The spacer is preferably designed exchangeable, such that the total length of the housing can be adjusted by exchanging and/or adjusting the spacer for a spacer of different length in the axial direction. The spacer can have a multi-part form. By having an adjustable total length of the nozzle, a thermal expansion of the nozzle during operation can be anticipated and/or compensated. This allows to utilize the nozzle installed in the same injection molding tool to handle different thermoplastic materials requiring different operating temperatures.

Depending on the field of application, the spacer comprises a ring and/or a bushing and/or a washer etc. Usually, the spacer is at least partially made from a rigid material, such as metal, in particular steel. A thermal coefficient of the spacer is preferably similar to a thermal coefficient of the housing, in particular of the front section, such that the expandability of the spacer is similar to the thermal expandability of the material used for the housing.

In a preferred variation the tip of the front section in combination with the front end of the needle form a molding contour for embedment into a molding cavity contour during operation. As described before the molding cavity contour at least partially defines the plastic part manufactured, in particular the outer shape thereof. Here the gate is formed by the tip of the front section. Due to the gate being incorporated in the tip, it can be easily replaced in the event of wear caused e.g., by the needle. The tip is usually integrally formed with the front section; however, a separate tip or tip arrangement is possible as well. Therefore, if appropriate, the front section can be of a multipart design, e.g., the front section comprises an outer part and a separate tip element being removably coupled to the outer part, in particular via retaining means. This allows to only replace the tip element of the nozzle e.g., in case of wear instead of replacing the front section in total. Additionally, depending on the specific cavity contour, the tip element can be selected to form in combination with the needle a matching molding contour, while the outer part can be generic and independent therefrom. Depending on the design, the retaining means comprise a flange arranged at the tip element in the axial direction between the spacer and an inward protrusion of the outer part in the assembled state. The tip element can be interconnected from the inside or from the outside to the outer part. Good results can be achieved when it is inserted from the rear into the outer part opposite to the tip end.

In the closed position, the front end of the needle is preferably flush with the tip of the front section. This avoids undesired injection marks on the plastic part caused by any offset of the front end of the needle with respect to the tip in the axial direction.

Good results can be achieved, when a length of the spacer in the axial direction is configurable to compensate thermal expansion of the assembled housing, respectively the assembled nozzle, in the axial direction, such that with respect to a thermoplastic material specific operating temperature the molding contour is embedded into a molding cavity contour in an adjustable manner, in particular flush manner. In some variations the total length of the housing can be configured via the length of the spacer, such that the molding contour extends beyond the molding cavity contour into the cavity. If requested, this even allows to manufacture plastic parts, with a slightly concave shape in the region of the injection mark. The spacer generally allows application-specific thermal expansion effects to be compensated. Furthermore, the position in the axial direction of the molding contour can be adjusted in the axial direction to compensate for thermal expansion of the housing. It should be said, that the position in the axial direction of the front end of the needle in the closed position is typically configurable as well. The spacer can be of a multi-part design, such that by adding additional parts the length of the spacer in axial direction can be increased, or by removal parts can be reduced. In other embodiments, the length of the spacer can be configured by a cutting process, such as grinding.

To further reduce wear of the gate and the needle, the nozzle comprises a needle centering means. In some variations, the needle centering means comprises at least one passage for the melt to pass the needle centering means. The needle centering means is typically arranged in axial direction between the spacer and the gate for centering the needle in radial direction during operation when moved between the open and the closed position. If appropriate, this allows to continuously center the needle. Preferably, the needle centering means is arranged close to the tip, in particular adjacent to the tip of the nozzle. Here, the needle centering means can be arranged in a pocket of the front section. This makes a wear intensive pre-centering of the needle during operation when moved between the open and the closed position e.g., by a tapered section of the central passage obsolete.

In some variations, the needle centering means is designed as a separate element inserted into the front section of the housing opposite to gate. This allows to remove the needle centering means, in case e.g., a replacement thereof is needed. In turn the manufacturing efforts and associated costs are reduced, as the needle centering means can be machined in a separate (optimized) cutting process. However, it is also possible to manufacture the needle centering means and the front section as a single part, e.g., by means of additive manufacturing. The needle centering means is preferably ring shaped. This allows a coaxial arrangement with the central passage in the central passage, wherein an outside surface of the ring-shaped needle centering means is during operation supported by the central passage of the front section.

To avoid any undesirable misalignment of the needle centering means with respect to the central passage, the needle centering means is preferably clamped between a shoulder of the pocket and the spacer. The shoulder is typically formed as a circumferential protrusion extending radially inward. The pocket is preferably arranged adjacent to the tip of the front section, such that a permanent centering of the needle by the needle centering means in the axial direction close do the gate is possible. This further improves the radial alignment of the front end of the needle with respect to gate.

The needle centering means usually comprises at least one fin extending in radial direction. The fin typically extends essentially straight with respect to the axial direction; however, the fin may extend in a curved manner in the axial direction around a central axis as well. Usually, the at least one fin comprises on the inside a guiding surface during operation centering the needle in radial direction. Preferably the guiding surface is essentially parallel to the needle, such that in case of a direct contact between the needle and the guiding surface, wear is minimized. To achieve this, when the needle has e.g., a circular cross-section, the guiding surface in turn has at least in regions a corresponding curvature. To reduce flow resistance for melted plastic material passing by the needle guiding means, the at least one fin may comprise in the axial direction tapered edges.

Good performance is possible, when the needle centering means comprises at least two fins, in particular three fins in circumferential direction spaced apart from each other. The respective guiding surfaces of the fins provide a circumferential support in radial direction for the needle arranged movable in the axial direction there between. Typically, the guiding means has a rotational symmetry about the axial direction. In case of three fins, the fins are preferably arranged in circumferential direction uniformly spaced apart from each other.

Alternatively, or in addition, the needle centering means comprises an inner ring and an outer ring spaced apart from each other by at least one bridge. The inner ring may comprise a guiding surface, facing the needle and having a corresponding curvature. Typically, between one and four bridges support the inner ring with respect to the outer ring.

The spacer and/or the guiding means may comprise an engagement contour for engaging with a corresponding tool for removal or replacement. As small tolerances of these parts are typical, a removal thereof, in particular after use is often impossible without damaging the spacer and the needle centering means as well as other parts of the nozzle. The engagement contour allows to precisely apply forces (linear in the axial direction and/or torque about the axial direction) in order to remove the spacer and/or the guiding means, in particular from the central passage. The engagement contour can be formed as a thread or a polygonal contour, such as a hexagon. Usually, the engagement contour is arranged at a rearward facing end of the spacer, the needle guiding means respectively.

If appropriate, the rear section comprises an outer thread and the front section comprises an inner thread engaging in a mounted position with the outer thread for interconnecting the front section to the rear section. Preferably the front section is detachable from the rear section, in particular by loosening the thread there between. Preferably the spacer comprises a rear sealing surface and a front sealing surface in a mounted position interacting with the front section and the rear section preventing leakage of melted thermoplastic material from the central passage. Depending on the field of application, the spacer is arranged in the central passage and forms part of the melt channel. This allows to prevent leakage from the central passage. In addition, an undesired flow melted plastic material in between the inner and the outer thread of the front respectively the rear section is also prevented by the spacer.

A first variation of an injection molding tool according to the disclosure for injection molding of thermoplastic materials, in particular polyolefin materials, comprises at least one cavity having a molding cavity contour at least partially defining plastic part formed therein from melted thermoplastic material. The injection molding tool further comprises at least one injection nozzle, as described above, arranged adjoining the cavity for supplying melted thermoplastic material to the cavity, said injection nozzle forming at least part of the molding cavity contour.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate embodiments, and together with the description serve to explain the principles and operation of the concepts disclosed.

BRIEF DESCRIPTION OF SEVERAL VIEWS OF THE DRAWINGS

The herein described disclosure will be more fully understood from the detailed description given herein below and the accompanying drawings which should not be considered limiting to the disclosure described in the appended claims. The drawings are showing:

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different foul's and should not be construed as limited to the embodiments set forth herein; rather, these embodiments are provided so that this disclosure will satisfy applicable legal requirements. Whenever possible, like reference numbers will be used to refer to like components or parts.

Figure 1:
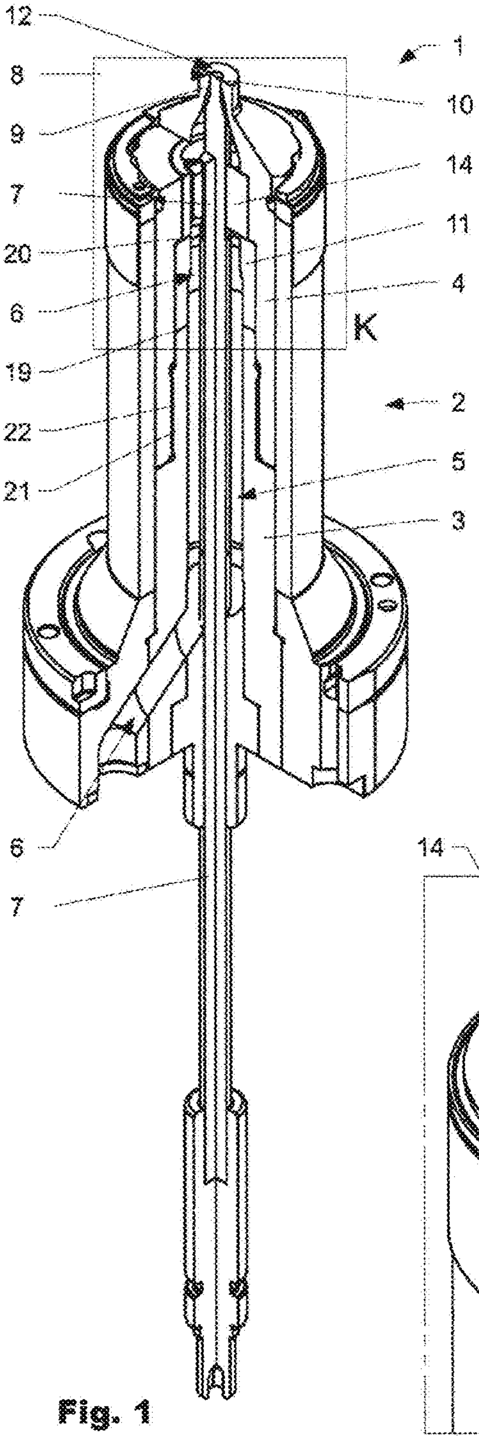
FIG. 1 shows a partially sectioned and perspective view of a first variation of an injection nozzle according to the disclosure.
Figure 1:
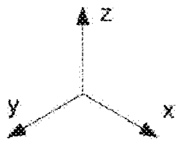
Figure 2:
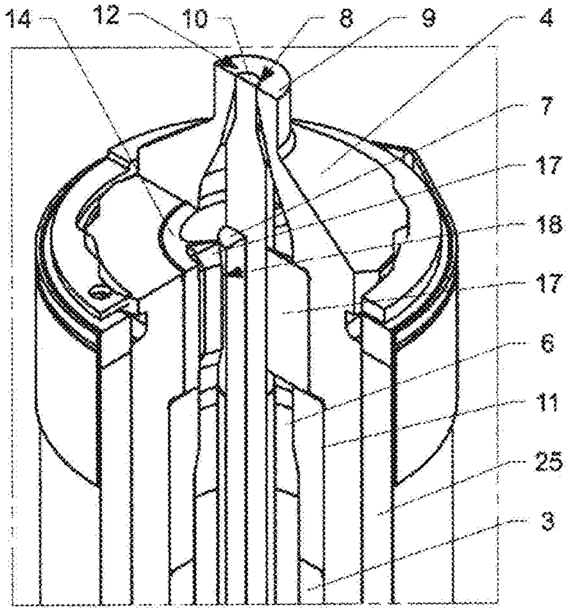
FIG. 2 shows a detailed view of the first variation of FIG. 1 indicated by box K.
Figure 3:
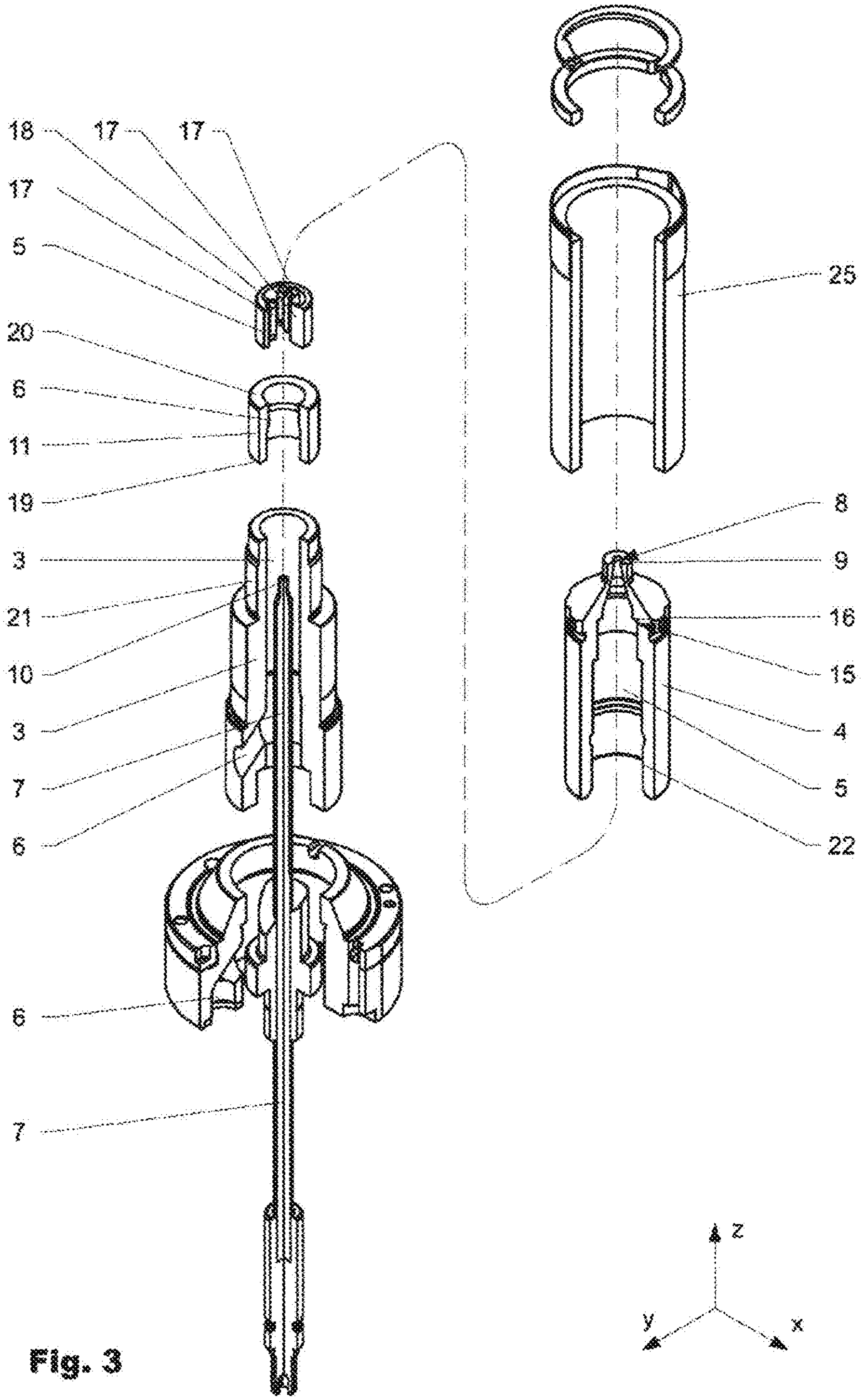
FIG. 3 shows an exploded view of the first variation.
Figure 4:
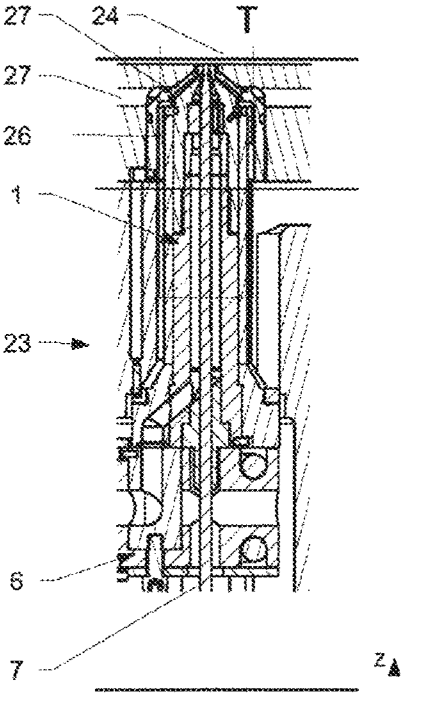
FIG. 4 shows a section view of a first variation of an injection molding tool according to the disclosure comprising a second variation of an injection nozzle according to the disclosure.
Figure 5:
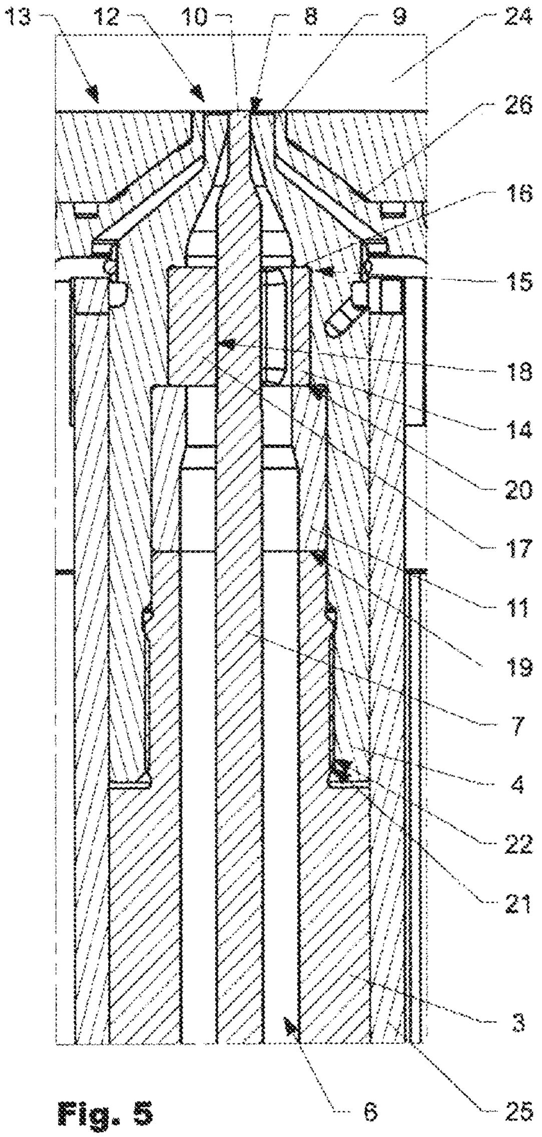
FIG. 5 shows a detailed view of FIG. 4 indicated by box T.
Figure 6:
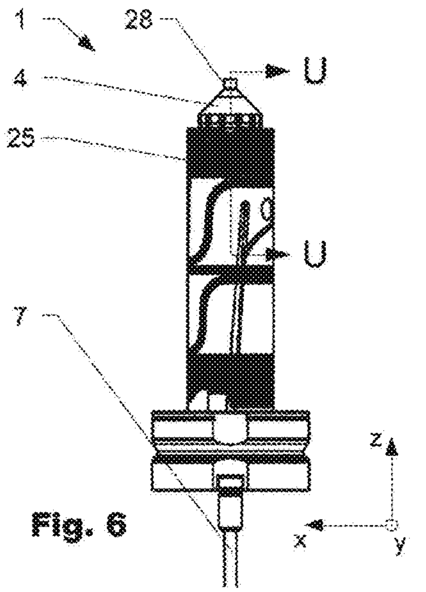
FIG. 6 shows a second variation of an injection nozzle according to the disclosure.
Figure 7:
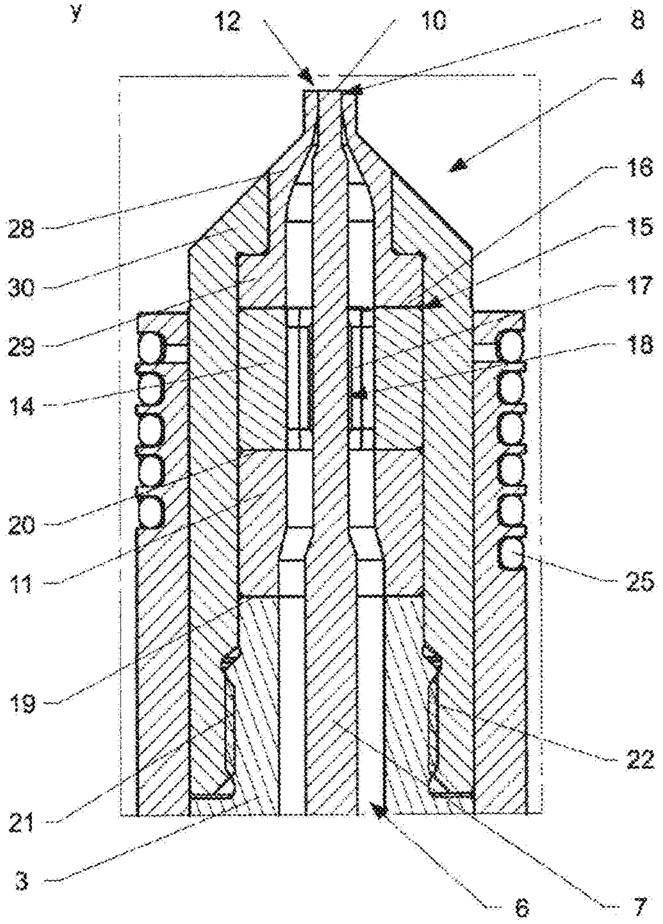
FIG. 7 shows a section view of the second variation of FIG. 6 along section line UU.

FIG. 1 shows a partially sectioned and perspective view of aa first variation of an injection nozzle 1 according to the disclosure and FIG. 2 shows a detailed view of the first variation of FIG. 1 indicated by box K. FIG. 3 is sowing an exploded view of the first variation of the injection nozzle 1. FIG. 4 illustrates a section view of a first variation of an injection molding tool 23 according to the disclosure comprising a second variation of an injection nozzle 1 according to the disclosure and FIG. 5 shows a detailed view of FIG. 4 indicated by box P. FIG. 6 shows a second variation of an injection nozzle 1 according to the disclosure and FIG. 7 shows a section view of the second variation of FIG. 6 along section line UU.

The first variation of the injection nozzle 1 comprises a housing 1, suitable to be installed in a corresponding injection molding tool 23 adjacent to a cavity 24, as visible in FIG. 4. As best visible in FIGS. 1 to 3, the housing typically comprises a sleeve-shaped rear section 3 and a thereto coaxially arranged sleeve-shaped front section 4 surrounding a central passage 5 extending in an axial direction z and forming part of a melt channel 6. The central passage 5 is fluidly interconnected to a melt channel 6 of the injection molding tool preferably at the rear section 3.

In the central passage 5 a needle 7 is arranged movable in the axial direction z between a retracted open position and an extended closed position in which a gate 8 at a tip 9 of the front section 4 is closed by a front end 10 of the needle 7 in a sealing manner. This is best visible in FIGS. 1 and 2. Here the tip is integrally formed with the front section 4 of the nozzle allowing a good distribution of heat from the heating element 25 arranged at least partially surrounding the housing 2, to the tip 9.

A spacer 11 is typically arranged between the rear section 3 and the front section 4 defining a total length of the nozzle 1 in the axial direction z. In the first variation of the nozzle 1, as shown in FIG. 3, the spacer 11 is formed as a bushing arranged in the central passage 5 of the housing 2. The spacer 11 is made at least partially from tool steel. The spacer 11 typically comprises a rear sealing surface 19 and a front sealing surface 20 in a mounted position interacting with the front section 4 and respectively the rear section 3 preventing leakage of melted thermoplastic material from the central passage 5. As visible in FIG. 5, in the variation of a bushing-type spacer 11, the front and rear sealing surfaces 19, 20 are arranged at end faces of the bushing 11. During operation the front sealing surface 20 is pressed against a corresponding surface of the front section 4 in the axial direction z. Analogously, the rear sealing surface 19 is pressed against a corresponding surface of the rear section 3. The spacer 11 is preferably arranged in the central passage 5 extending in the axial direction z between a needle centering means 14 and the rear section 3 and forms part of the melt channel 6.

As best visible in FIG. 2, the tip 9 of the front section 4 in combination with the front end 10 of the needle 7 form a molding contour 12 embedded during operation into a molding cavity contour 13. This is shown in FIG. 5. The length of the spacer 11 in the axial direction z is adjustable, in particular, as the spacer 11 is designed exchangeable for a spacer 11 of different length.

As indicated above, injection nozzle 1 preferably comprises a needle centering means 14 comprising at least one passage for the melt to pass the needle centering means 14. The needle centering means 14 is arranged between the gate 8 at the front section 4 and the spacer 11, for centering the needle 7 in radial direction during operation when moved between the open and the closed position. This is best illustrated in FIG. 5. In the shown variations, the needle centering means 14 is formed as a separate, ring-shaped part, comprising three fins 17, each extending in a radially inward direction. Each fin typically comprises a guiding surface 18 for axially guiding the needle 7 and thereby centering the needle 7 in radial direction. As visible in FIGS. 2 and 5, the needle centering means 14 is preferably arranged in a pocket 15 of the front section 4 in the central passage 5, adjacent to the tip 9 of the nozzle 1. The pocket 15 comprises a circular shoulder 16 for supporting the needle centering means 14 in the axial direction z, when it is pressed during operation by the spacer 11 in the axial direction.

As shown in FIG. 3, the rear section 3 may comprise an outer thread 21 and the front section 4 may comprise a corresponding inner thread 22 for engaging with the outer thread 21 to interconnect the front section 4 to the rear section 3. Typically, the front section 4 is detachably interconnected to the rear section 3, however a fixed interconnection is thinkable as well.

FIG. 4 shows a section view of an injection molding tool 23, comprising an injection nozzle 1 according to the disclosure. The injection molding tool 23 comprises at least one cavity 24 having a molding cavity contour 13 defining the shape of a plastic part formed therein from melted thermoplastic material. The injection molding tool 23 further comprises at least one injection nozzle 1, as described before, arranged adjoining the cavity 24 for supplying melted thermoplastic material to the cavity, via the melt channel 6. The injection nozzle 1 forms at least part of the molding cavity contour 13, as visible in FIG. 5.

Optionally, a bushing 26 is arranged at least partially surrounding the tip 9 of the nozzle 1. The bushing comprises on its outside an indentation forming part of a cooling channel 27, for cooling the busing 26. The cooling channel is usually interconnected to a cooling circuit (not shown) of the injection molding tool 23.

The second variation of the nozzle 1 as visible in FIGS. 6 and 7 has a multipart front section 4. The front section 4 comprises an outer part 30 and a separate tip element 28 being removably coupled to the outer part 30. The Tip element 28 is in the shown second variation coupled to the outer part 30 by a retaining means 29 formed as a flange 29. The flange 29 is arranged in the axial direction z between the outer part 30 and the needle centering means 14. In addition, the flange 29 acts as the shoulder 15, forming in combination with the outer part 30 the pocket 15 to accommodate and support the needle centering means 14 with respect to the spacer 11 and thereby to the rear part 3. To remove the tip element 28 from the outer part 30, the outer part in unscrewed from the rear section 3.

Rather, the words used in the specification are words of description rather than limitation, and it is understood that changes may be made without departing from the scope of the disclosure.

The invention claimed is:

1. An injection nozzle suitable for injection molding of thermoplastic materials, in particular polyolefin materials, the injection nozzle comprising:

a. a housing comprising a sleeve-shaped rear section and a thereto coaxially arranged sleeve-shaped front section surrounding a central passage extending in an axial direction (z) forming part of a melt channel in which a needle is arranged movable in the axial direction (z) between a retracted open position and an extended closed position in which a gate at a tip of the front section is closed by a front end of the needle in a sealing manner; wherein b. a spacer is arranged between the rear section and the front section defining a total length of the housing in the axial direction (z), c. wherein the injection nozzle comprises a needle centering means for centering the needle in a radial direction during operation when moved between the open and the closed position.

2. The injection nozzle according to claim 1, wherein the spacer comprises at least one of a ring, a bushing, and a washer.

3. The injection nozzle according to claim 1, wherein the needle centering means is arranged in a pocket of the front section.

4. The injection nozzle according to claim 3, wherein the needle centering means is clamped between a shoulder of the pocket and the spacer.

5. The injection nozzle according to claim 1, wherein the needle centering means is ring shaped.

6. The injection nozzle according to claim 1, wherein the needle centering means comprises at least one fin extending in radial direction and comprising on the inside a guiding surface during operation centering the needle in the radial direction.

7. The injection nozzle according to claim 3, wherein the needle centering means comprises at least two fins in a circumferential direction spaced apart from each other.

8. The injection nozzle according to claim 1, wherein the tip of the front section in combination with the front end of the needle form a molding contour configured to embed into a molding cavity contour during operation.

9. The injection nozzle according to claim 8, wherein a length of the spacer in the axial direction (z) is configurable to compensate thermal expansion of the housing in the axial direction (z), such that with respect to a thermoplastic material specific operating temperature the molding contour is embedded into a molding cavity contour in an adjustable and/or flush manner.

10. The injection nozzle according to claim 1, wherein the spacer comprises a rear sealing surface and a front sealing surface in a mounted position interacting with the front section and the rear section preventing leakage of melted thermoplastic material from the central passage.

11. The injection nozzle according to claim 1, wherein the rear section comprises an outer thread and the front section comprises an inner thread engaging in a mounted position with the outer thread for interconnecting the front section to the rear section.

12. The injection nozzle according to claim 1, wherein the spacer is arranged in the central passage and forms part of the melt channel.

13. The injection nozzle according to claim 1, wherein the spacer and/or the needle centering means comprises an engagement contour for engaging with a corresponding tool for removal or re-placement.

14. The injection nozzle according to claim 1, wherein the front section comprises an outer part and a tip element.

15. The injection nozzle according to claim 14, wherein the tip element is interconnected from the inside or from the outside to the outer part.

16. An injection molding tool for injection molding of thermoplastic materials, in particular polyolefin materials, the injection molding tool comprising:

a. at least one cavity having a molding cavity contour at least partially defining plastic part formed therein from melted thermoplastic material; and b. at least one injection nozzle according to claim 1 arranged adjoining the cavity for supplying melted thermoplastic material to the cavity, the injection nozzle forming at least part of the molding cavity contour.

* * * * *